United States Patent
Kawahito

(10) Patent No.: US 8,598,507 B2
(45) Date of Patent: Dec. 3, 2013

(54) SENSOR CIRCUIT INTEGRATED WITH SIGNAL PROCESSING CIRCUIT AND CHARGING CIRCUIT

(75) Inventor: Shoji Kawahito, Hamamatsu (JP)

(73) Assignee: National University Corporation Shizuoka University (JP)

(*) Notice: Subject to any disclaimer, the term of this patent is extended or adjusted under 35 U.S.C. 154(b) by 132 days.

(21) Appl. No.: 13/264,299

(22) PCT Filed: Apr. 16, 2010

(86) PCT No.: PCT/JP2010/056857
§ 371 (c)(1),
(2), (4) Date: Oct. 13, 2011

(87) PCT Pub. No.: WO2010/119957
PCT Pub. Date: Oct. 21, 2010

(65) Prior Publication Data
US 2012/0091323 A1 Apr. 19, 2012

(30) Foreign Application Priority Data
Apr. 17, 2009 (JP) ................................ 2009-101271

(51) Int. Cl.
*G01J 1/44* (2006.01)
*H01L 27/14* (2006.01)

(52) U.S. Cl.
USPC .................................. 250/214 R; 250/208.1

(58) Field of Classification Search
USPC ............ 250/214 R, 208.1; 257/290–294, 440; 348/308, 309, 311
See application file for complete search history.

(56) References Cited

U.S. PATENT DOCUMENTS

| 6,037,979 | A  * | 3/2000 | Yonemoto ..................... | 348/308 |
| 7,755,688 | B2 * | 7/2010 | Hatano et al. ................. | 348/300 |
| 8,174,600 | B2 * | 5/2012 | Ogura et al. .................. | 348/301 |

FOREIGN PATENT DOCUMENTS

| JP | 6-189199 | 7/1994 |
| JP | 2000-236485 | 8/2000 |
| JP | 2003-153085 | 5/2003 |
| JP | 2006-25189 | 1/2006 |
| JP | 2006-186467 | 7/2006 |

OTHER PUBLICATIONS

International Preliminary Report on Patentability and Written Opinion issued on Nov. 22, 2011 in connection with corresponding International Application No. PCT/JP2010/056857.
International Search Report mailed May 25, 2010 in connection with corresponding International Application No. PCT/JP2010/056857.

* cited by examiner

*Primary Examiner* — Georgia Y Epps
*Assistant Examiner* — Carolynn Moore
(74) *Attorney, Agent, or Firm* — Ostrolenk Faber LLP

(57) ABSTRACT

A sensor circuit integrated with a signal processing circuit and a charging circuit. The sensor circuit has a sensor voltage source to which a sensor internal resonance is connected in series, the signal processing circuit having a capacitor to which the sensor voltage source is connected via a signal line of the charging circuit, and a switch. The charging circuit includes another capacitor connected to the signal line, and a drive circuit at an input side of which the other capacitor is connected and which has a transconductance equivalent to an internal resistance.

13 Claims, 8 Drawing Sheets

SENSOR CIRCUIT INTEGRATED WITH SIGNAL PROCESSING CIRCUIT AND CHARGING CIRCUIT

CROSS REFERENCE TO RELATED APPLICATIONS

The present application is a 35 U.S.C. §371 national phase conversion of PCT/JP2010/056857 filed Apr. 16, 2010 and claims priority of JP 2009-101271 filed Apr. 17, 2009, both incorporated herein their entirety.

TECHNICAL FIELD

The present invention relates to a sensor integrated circuit.

BACKGROUND ART

Patent Literature 1 describes a high-sensitivity imaging device. At noise level of an image sensor, noise generated by a circuit of an amplifier and the like is dominant. This high-sensitivity imaging device, by a process in a digital area, reduces random noise generated by a circuit of a column amplifier and the like. Patent Literature 2 describes an image sensor. An A/D converter array is provided on a CMOS image sensor column to generate a digital output. By generating a level difference between the signal level and reset level converted to digital signals, high-accuracy fixed pattern noise cancellation and random noise reduction is enabled.

CITATION LIST

Patent Literature

Patent Literature 1: Japanese Patent Application Laid-Open No. 2003-153085
Patent Literature 2: Japanese Patent Application Laid-Open No. 2006-25189

SUMMARY OF INVENTION

Technical Problem

For one application purpose, it has been desired to sample from pixels (for example, CMOS image sensor cells) their output signals more speedily and perform a readout process of the sampled signals. For another application purpose, it has been desired to perform a readout process of output signals from an image sensor that receives a weak light signal or a low-luminance image within a shorter time. Therefore, signals from the pixels are processed by signal processing circuits. The response speed of these circuits is determined by various factors. Examples of these factors include output impedance of a circuit such as a pixel circuit or an amplifier circuit, input capacitance of a processing circuit such as a sampling circuit that receives a signal from the circuit via a signal line, and parasitic capacitance of a signal line such as a column line.

On the other hand, an in-pixel circuit and a circuit connected to a pixel output provide so-called analog signals, and their final voltage values cannot be known until driving is completed. Moreover, since the final value of a signal from a drive circuit depends on the amount of light received at each sensor element of a pixel or the value of an input signal of the amplifier circuit, a period for sufficient driving of the drive circuit is required for accurate readout.

A sensor circuit including a sensor element is integrated together with a signal processing circuit and the like for processing a readout signal from the sensor circuit. For example, a sense integrated circuit includes a sensor circuit such as a pixel circuit for an image sensor, and reads out a signal from the sensor circuit. This sense integrated circuit includes a sensor circuit, a signal processing circuit, and a readout circuit. The sensor circuit generates a signal indicating a sense value of the sensor element and drives a signal line in a driving period, and the signal processing circuit receives a signal from the sensor circuit via a signal line and processes the signal, and provides a signal to the readout circuit.

It is an object of the present invention to provide a sensor integrated circuit including a sensor circuit and a signal processing circuit, which is capable of reducing a signal transmission time from the sensor circuit to the signal processing circuit, without impairing the accuracy of a final value of a transmitted signal. It is also an object of the present invention to provide a sensor integrated circuit including a sensor circuit, a signal processing circuit, and a readout circuit, which is capable of reducing a signal transmission time from the sensor circuit to the readout circuit, without impairing the accuracy of a final value of a transmitted signal.

Solution to Problem

A sensor integrated circuit according to the present invention includes a sensor circuit, a signal processing circuit, and a charging circuit having an input and output connected to a signal line. This sensor circuit has a sensor voltage source to which a sensor internal resonance Rs is connected in series. The signal processing circuit has a capacitor to which the sensor voltage source is connected via the signal line and a switch. The capacitor, at the time of charging of the capacitor, is connected to the sensor voltage source via the switch and, at the time of voltage holding of the capacitor, is disconnected from the sensor voltage source by the switch, so that a sensor voltage signal on the capacitor is output from the signal processing circuit. The charging circuit includes another capacitor connected to the signal line, and a drive circuit at an input side of which the other capacitor is connected and which has a transconductance equivalent to an internal resistance R2. The charging circuit includes a reset switch which makes an output of the drive circuit and an input of the drive circuit equal in potential, and an output switch which makes the output of the drive circuit and the signal line equal in potential.

In the sensor integrated circuit according to the present invention, the signal line has a parasitic capacitor Cp (capacitance: Cp). Where the capacitor is provided as $C_{1i}$ (capacitance: Cs), the other capacitor is provided as $C_{2i}$ (capacitance: Ca), the sensor internal resistance is provided as Rs, and the internal resistance of the charging circuit is provided as R2, Cp<Ca<Cs, and Ca×R2<Cs×Rs.

In the sensor integrated circuit according to the present invention, the charging circuit starts a charging operation after a start point of a first driving period for driving of the signal line in response to a potential of the input of the charging circuit, and stops supplying the output of the charging circuit with a charge prior to an end point of the first driving period.

A sensor integrated circuit according to the present invention includes (a) a sensor circuit including a sensor element and an output which outputs a first signal indicating a sense value of the sensor element, (b) a signal processing circuit including an input which receives the first signal from the sensor circuit in a first receiving period and an output which outputs a second signal generated by processing the first signal, (c) a readout circuit which receives the second signal in a second receiving period, and (d) a charging circuit having an input and output connected to a signal line. The signal processing circuit includes either one of an amplifier and an integrator. The signal line achieves either one of the connections between the output of the sensor circuit and the input of the signal processing circuit and between the output of the signal processing circuit and the input of the readout circuit. Another signal line achieves either the other of the connections between the output of the sensor circuit and the input of the signal processing circuit and between the output of the signal processing circuit and the input of the readout circuit. The charging circuit starts a charging operation after a start point of a first driving period for driving of the signal line in response to a potential of the input of the charging circuit, and stops supplying the output of the charging circuit with a charge prior to an end point of the first driving period.

According to the above-described sensor integrated circuit, the charging circuit is connected to a signal line, and either one circuit (hereinafter, referred to as a "first circuit") of the output of the sensor circuit and the output of the signal processing circuit is connected to the signal line. The first circuit drives the signal line in the first driving period. The charging circuit starts a charging operation after the start point of the first driving period in response to the potential of its input, and thus performs operation according to the operation of the first circuit. Moreover, the charging circuit stops supplying the output of the charging circuit with a charge prior to the end point of the first driving period, and thus the operation of the charging circuit does not have an effect on a final value of a driven value of the signal line. After the charging operation of the charging circuit ends, the first circuit makes the potential of the signal line arrive at a final value.

In the sensor integrated circuit according to the present invention, the signal line achieves a connection between the output of the sensor circuit and the input of the signal processing circuit, the input of the signal processing circuit has a first input capacitance, the input of the charging circuit has a second input capacitance, the second input capacitance is smaller than the first input capacitance, the output of the sensor circuit has a first output resistance, the output of the charging circuit has a second output resistance, the second output resistance is smaller than the first output resistance during charging of the charging circuit, a change from an initial value to a first driven value and a change from a second driven value to a final value in potential of the signal line are performed by the sensor circuit, and a change from the first driven value to the second driven value in potential of the signal line is performed by the charging circuit and the sensor circuit.

According to the above-described sensor integrated circuit, when the sensor circuit performs driving of a parasitic capacitance of the signal line and the input of the signal processing circuit, first, in that driving period, the sensor circuit drives a parasitic capacitor of the signal line and an input capacitor of the charging circuit prior to the start of a receiving period. Thereafter, the charging circuit starts charging to the signal line in response to the potential at its input. The sensor circuit and the charging circuit drive the input of the signal processing circuit having an input capacitance larger than that of the charging circuit. Since the second output resistance of the charging circuit is smaller than the first output resistance of the sensor circuit, the charging circuit assists driving by the sensor circuit. Moreover, since the charging circuit ends charging before the end point of the driving period, charging or driving to a final value (analog value) is performed by the sensor circuit. Hence, the accuracy of the final value is never impaired. Since the second input capacitance of the charging circuit is smaller than the first input capacitance, a capacitive load to be connected to the output of the sensor circuit is increased very little by addition of the charging circuit.

In the sensor integrated circuit according to the present invention, the signal line achieves a connection between the output of the signal processing circuit and the input of the readout circuit, the input of the readout circuit has a third input capacitance, the input of the charging circuit has a second input capacitance, the output of the signal processing circuit has a third output resistance, the output of the charging circuit has a second output resistance, the second input capacitance is smaller than the third input capacitance, the second output resistance is smaller than the third output resistance during charging of the charging circuit, a change from an initial value to a third driven value and a change from a fourth driven value to a final value in potential of the signal line are performed by the signal processing circuit, and a change from the third driven value to the fourth driven value in potential of the signal line is performed by the charging circuit and the signal processing circuit.

According to the above-described sensor integrated circuit, when the signal processing circuit performs driving of a parasitic capacitance of the signal line and the input of the readout circuit, first, in that driving period, the signal processing circuit drives a parasitic capacitor of the signal line and an input capacitor of the charging circuit prior to the start of a receiving period. The charging circuit starts charging to the signal line in response to the potential at its input. The charging circuit and signal processing circuit drive the readout circuit having a large input capacitance. Since the second output resistance of the charging circuit is smaller than the third output resistance, the charging circuit assists driving by the signal processing circuit. Since the charging circuit ends charging before the end point of the driving period, charging or driving to a final value (analog value) is performed by the signal processing circuit. Hence, the accuracy of the final value is never impaired. Since the second input capacitance of the charging circuit is smaller than the third input capacitance, a capacitive load to be connected to the output of the signal processing circuit is increased very little by addition of the charging circuit.

In the sensor integrated circuit according to the present invention, the charging circuit includes an input capacitor having one end connected to the input of the charging circuit, a drive circuit having an input connected to the other end of the input capacitor, and a switch which is connected between an output of the drive circuit and the output of the charging circuit and conducts in a charging period shorter than the driving period, and the charging circuit performs sampling of the potential of the signal line for the input capacitor prior to charging. According to the above-described sensor integrated circuit, the input capacitor substantially defines the second input capacitance. A combined equivalent resistance of the output of the drive circuit and the switch substantially defines the second output resistance. In this charging circuit, the input of the drive circuit responds to a change in potential on the signal line received via the input capacitor. The end point of a charging period by the charging circuit is defined by an operation of the switch that becomes non-conductive before the end point of the driving period.

In the sensor integrated circuit according to the present invention, the readout circuit includes a correlated double sampling circuit connected to the output of the signal processing circuit, and the correlated double sampling circuit includes a first capacitor which stores a first sense signal indicating a sense value in the sensor circuit, a first switch connected between the first capacitor and the input of the readout circuit, a second capacitor which stores a second sense signal indicating a sense value in the sensor circuit, and a second switch connected between the second capacitor and the input of the readout circuit.

In the sensor integrated circuit according to the present invention, the sensor circuit is a pixel circuit of an image sensor, the pixel circuit includes a photoelectric conversion element as the sensor element and an amplifier circuit which amplifies a signal from the photoelectric conversion element, and the first sense signal includes a first pixel signal corresponding to a reset level of the sensor circuit, and the second sense signal includes a second pixel signal including a component of a signal level of the sensor circuit. According to the above-described sensor integrated circuit, the charging circuit assists driving of the signal line by the amplifier circuit of the pixel circuit. Since the charging circuit ends charging before the end point of the driving period, charging or driving to a final value (analog value) is performed by the amplifier circuit of the pixel circuit.

In the sensor integrated circuit according to the present invention, it may be possible that the signal processing circuit includes the amplifier, an input of the amplifier receives a signal from the input of the signal processing circuit, and the amplifier includes third and fourth capacitors that define a gain of the amplifier and an operational amplifier circuit which operates together with the third and fourth capacitors to amplify a signal received at the input of the amplifier. According to the above-described sensor integrated circuit, the amplifier amplifies a signal from the pixel circuit. The signal transmission time from the pixel circuit to the amplifier is reduced without impairing the accuracy of a final value. The capacitors of the amplifier define the second input capacitance. Moreover, the signal transmission time can be reduced without an increase in consumption current in the amplifier.

In the sensor integrated circuit according to the present invention, it may be possible that the signal processing circuit includes the integrator, an input of the integrator receives a signal from the input of the signal processing circuit, and the integrator includes a sampling circuit which samples a signal from the input of the integrator and an integrator circuit which integrates a signal sampled by the sampling circuit. According to the above-described sensor integrated circuit, the integrator processes a signal from the pixel circuit. The signal transmission time from the pixel circuit to the integrator is reduced without impairing the accuracy of a final value. The sampling circuit defines the second input capacitance. Moreover, the signal transmission time can be reduced without an increase in consumption current in the integrator.

The sensor integrated circuit according to the present invention may further include another charging circuit having an input and output connected to another signal line. The other charging circuit starts a charging operation after a start point of a second driving period in response to a potential of the input of the other charging circuit, and stops supplying the output of the other charging circuit with a charge prior to an end point of the second driving period. According to the above-described sensor integrated circuit, the other charging circuit is connected to another signal line, and either the other circuit (hereinafter, referred to as a "second circuit") of the sensor circuit and the signal processing circuit is connected to the other signal line. The second circuit drives the other signal line in the second driving period. The other charging circuit starts a charging operation after the start point of the second driving period in response to the potential of its input, and thus performs operation according to the operation of the second circuit. Moreover, the other charging circuit stops supplying the output of the other charging circuit with a charge prior to the end point of the second driving period, and thus the operation of the other charging circuit does not have an effect on a final value of a driven value of the other signal line. After the charging operation of the other charging circuit ends, the second circuit makes the potential of the signal line arrive at a final value.

In the sensor integrated circuit according to the present invention, the other charging circuit includes another input capacitor having one end connected to the other signal line, another drive circuit having an input connected to the other end of the input capacitor, and a switch which is connected between an output of the other drive circuit and the other signal line and conducts in a charging period shorter than the second driving period, and the other charging circuit performs sampling of the potential of the other signal line for the other input capacitor prior to charging before the start point of a second receiving period. According to the above-described sensor integrated circuit, the input capacitor substantially defines a fourth input capacitance. A combined equivalent resistance of the output of the drive circuit and the switch substantially defines a fourth output resistance. In the other charging circuit, the input of the drive circuit responds to a change in potential on the other signal line received via the input capacitor. The end point of a charging period by the other charging circuit is defined by an operation of the switch that becomes non-conductive before the end point of the second driving period.

Advantageous Effects of Invention

The present invention aims to provide a sensor integrated circuit including a sensor circuit and a signal processing circuit, which is capable of reducing a signal transmission time from the sensor circuit to the signal processing circuit, without impairing the accuracy of a final value of a transmitted signal. The present invention also provides a sensor integrated circuit including a sensor circuit, a signal processing circuit, and a readout circuit, which is capable of reducing a signal transmission time from the sensor circuit to the readout circuit, without impairing the accuracy of a final value of a transmitted signal.

DESCRIPTION OF EMBODIMENTS

The findings of the present invention will be easily understood by considering the following detailed description with reference to the accompanying drawings shown by way of example. In the following, embodiments of a sensor integrated circuit of the present invention will be described with reference to the accompanying drawings. Wherever possible, the same parts are denoted with the same reference signs.

Figure 1:
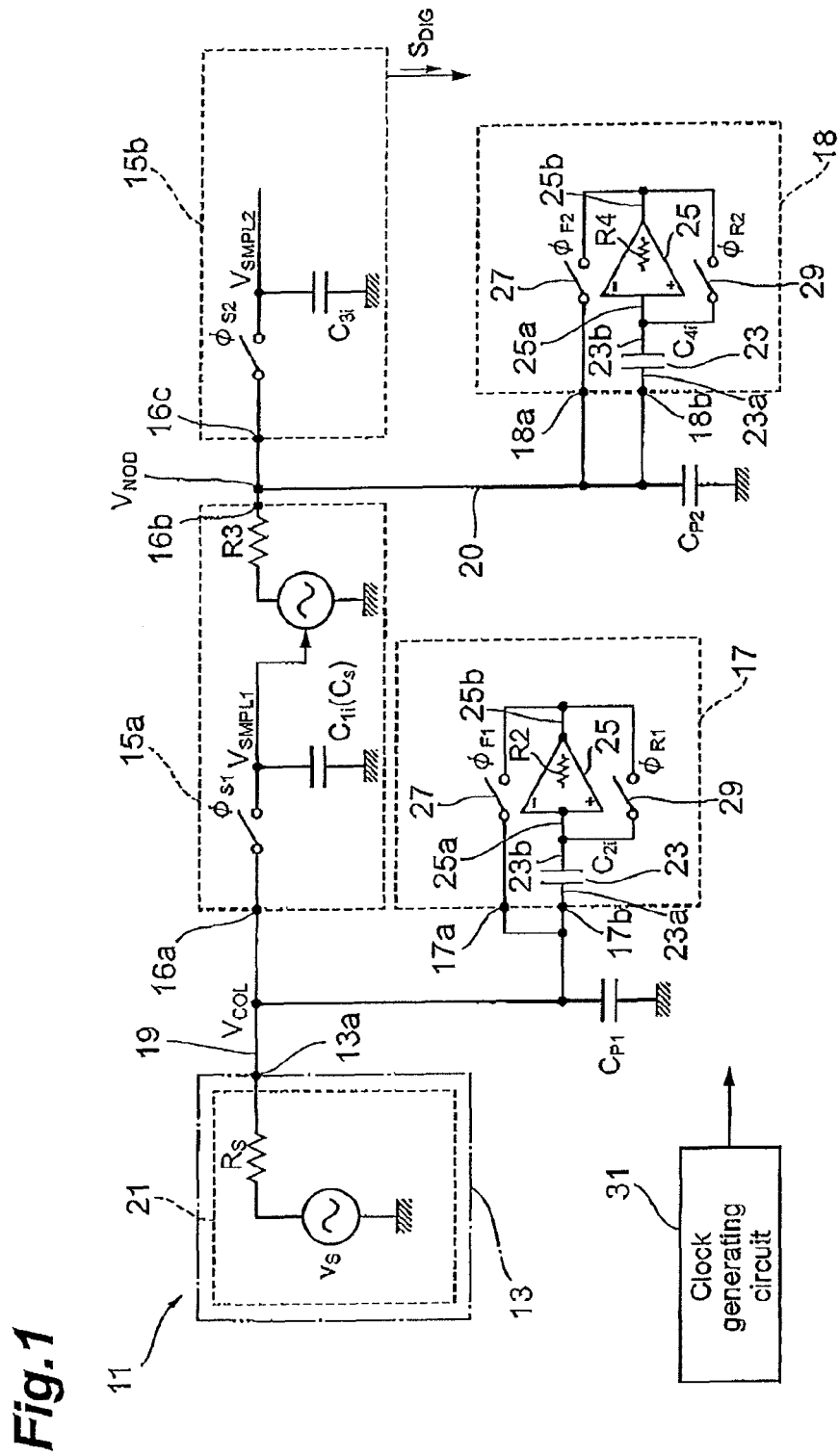
FIG. 1 is a drawing schematically showing a sensor integrated circuit and image sensor circuit according to the present embodiment.
Figure 2:
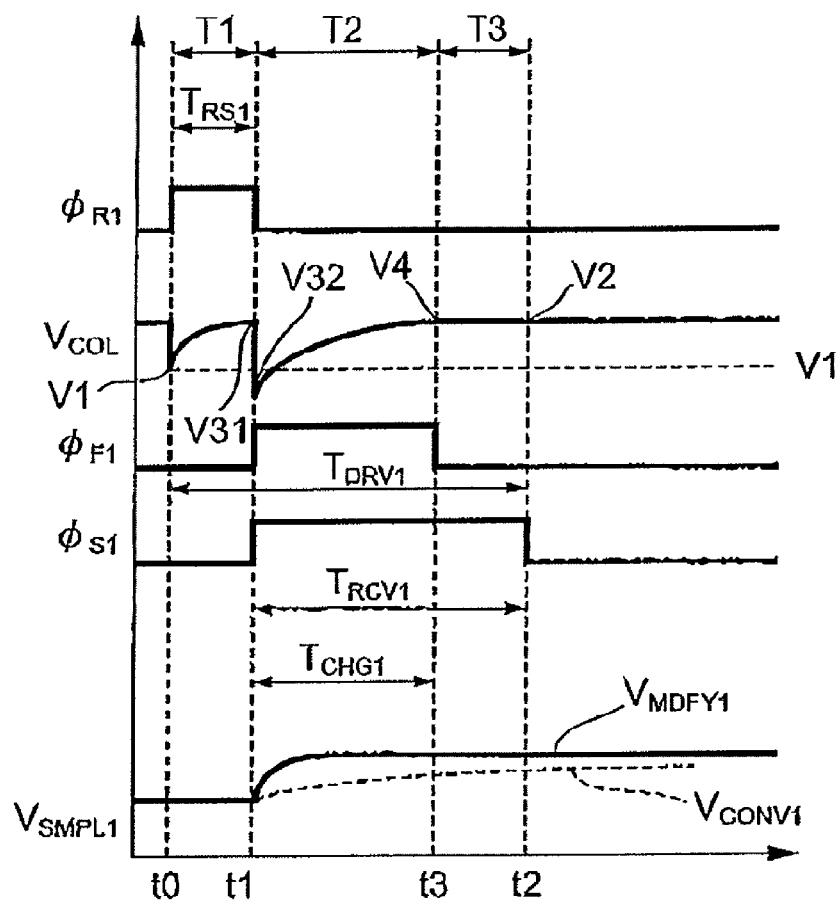
FIG. 2 shows a schematic timing chart of this sensor integrated circuit.
Figure 3:
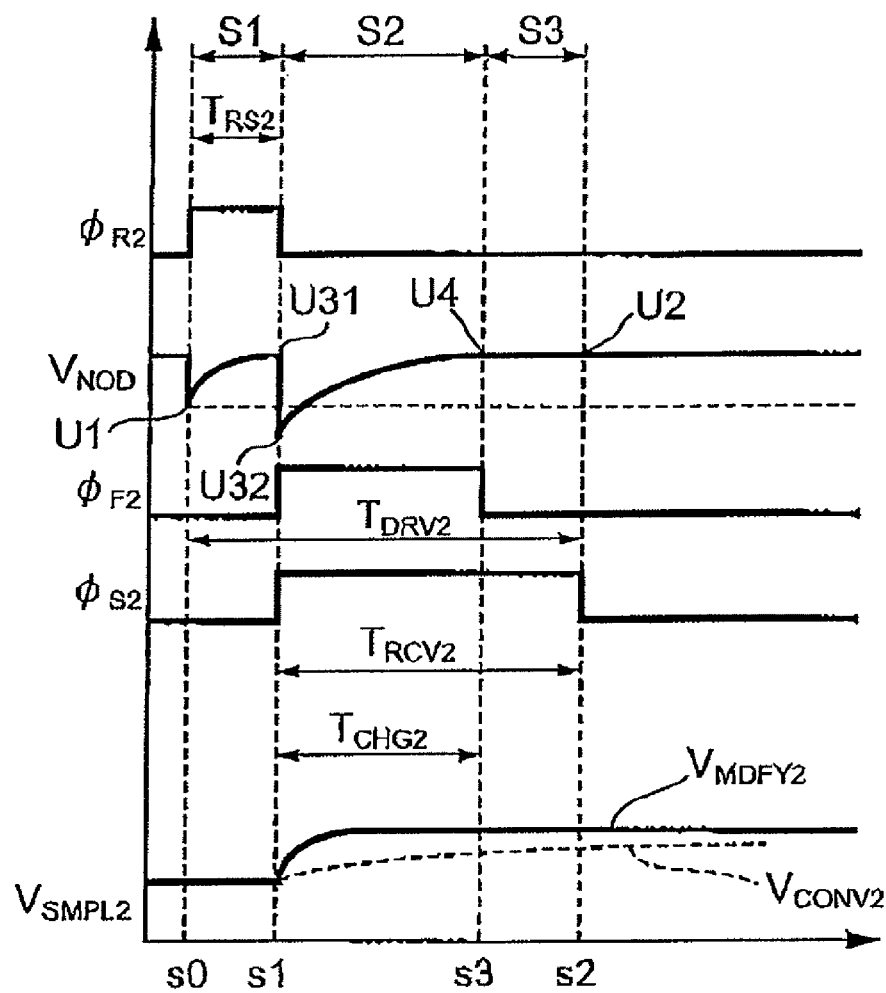
FIG. 3 shows a schematic timing chart of this sensor integrated circuit.

FIG. 1 is a drawing schematically showing a sensor integrated circuit according to the present embodiment. FIG. 2 is a drawing showing a schematic timing chart in a signal processing circuit of the sensor integrated circuit according to the present embodiment. FIG. 3 is a drawing showing a schematic timing chart in a readout circuit of the sensor integrated circuit according to the present embodiment. The sensor integrated circuit 11 includes a sensor circuit 13, a signal processing circuit 15a, a readout circuit 15b, a first charging circuit 17, and a second charging circuit 18. The sensor circuit 13 includes an output 13a connected to a signal line 19 and a detection circuit (for example, a pixel 21) including a sensor element, and has a first output resistance Rs. The sensor circuit 13 generates a signal $V_S$ indicating a sense value of this sensor element, and this signal $V_S$ is generated by a sensor voltage source. The output resistance Rs is connected in series to the sensor voltage source. The signal processing circuit 15a has a capacitor $C_S$. The capacitor $C_S$ is connected to the signal processing circuit 15a via the signal line 19. Moreover, the sensor voltage source is connected to the capacitor $C_S$ via a switch of the signal processing circuit 15a and the signal line 19.

The signal processing circuit 15a is connected to the output 13a of the sensor circuit 13 via the signal line 19. Moreover, the signal processing circuit 15a includes an input 16a having a first input capacitance, and processes a signal received from the sensor circuit 13 via the signal line 19. Moreover, the charging circuit 17 includes an output 17a connected to the signal line 19 and an input 17b connected to the signal line 19. The output 17a of the charging circuit 17 has a second output resistance (for example, a value R2) smaller than the first output resistance Rs in a charging period ("$T_{CHG1}$" in FIG. 2) of the charging circuit 17, and the input 17b of the charging circuit 17 has a second input capacitance smaller than the input capacitance (first input capacitance) of the signal processing circuit 15a.

The sensor circuit 13 changes the potential of the signal line 19 from its initial value to a first driven value. After the potential of the signal line 19 reaches the first driven value, the charging circuit 17 starts a charging operation in response to the first driven value received at the input 17b. In the charging period $T_{CHG1}$ during which the charging circuit 17 drives the signal line 19, the charging circuit 17 and the sensor circuit 13 change the potential of the signal line 19 from the potential at the start of charging to a second driven value. When the charging period $T_{CHG1}$ ends, the charging circuit 17 stops the charging operation. After the potential of the signal line 19 reaches the second driven value, the sensor circuit 13 changes the potential of the signal line 19 from the second driven value to a final value.

The readout circuit 15b is connected to an output 16b of the signal processing circuit 15a via a signal line 20, and the output 16b has a third output resistance (for example, a value R3). Moreover, the readout circuit 15b includes an input 16c having a third input capacitance, and processes a signal received via the signal line 20 from the signal processing circuit 15a. The charging circuit 18 includes an output 18a connected to the signal line 20 and an input 18b connected to the signal line 20. The output 18a of the charging circuit 18, in a charging period ("$T_{CHG2}$" in FIG. 3) of the charging circuit 18, has a fourth output resistance (for example, a value R4) smaller than the third output resistance (R3), and the input 18b of the charging circuit 18 has a fourth input capacitance smaller than the input capacitance (third input capacitance) of the readout circuit 15b.

Moreover, the signal processing circuit 15a changes the potential of the signal line 20 from its initial value to a third driven value. After the potential of the signal line 20 reaches the third driven value, in the charging period $T_{CHG2}$, the charging circuit 18 and the signal processing circuit 15a change the potential of the signal line 20 from the potential at the start of charging to a fourth driven value. After the potential of the signal line 20 reaches the fourth driven value, the signal processing circuit 15a changes the potential of the signal line 20 from the fourth driven value to a final value.

The action of the charging circuits 17 and 18 will be described. As shown in FIG. 2, the charging circuit 17 starts charging to the signal line 19 via the output 17a in response to a potential $V_{COL}$ at the input 17b of the charging circuit 17 and ends charging at time t3 before time t2 being the end point of a driving period $T_{DRV1}$.

According to the sensor integrated circuit 11, the sensor circuit 13 starts driving of a parasitic capacitance $C_{P1}$ of the signal line 19 and the first input capacitance $C_{1i}$ ($=C_S$) of the signal processing circuit 15a at time to. At this time of driving, the charging circuit 17, at time t1, starts charging to the signal line 19 in response to a change in potential $V_{COL}$ at the input 17b of the charging circuit 17. Since the second output resistance R2 of this charging circuit 17 is smaller than the first output resistance Rs, the driving time for the sensor circuit 13 can be reduced. Since the charging circuit 17 ends charging at time t3 before time t2 being the end point of the driving period $T_{DRV1}$, charging or driving to the final value of a signal on the signal line 19 is performed, without assistance of the charging circuit 17, from time t3 to t2 by the sensor circuit 13. Hence, the accuracy of the final value (analog value) is never impaired due to addition of the charging circuit 17. Since the second input capacitance of the charging circuit 17 is smaller than the first input capacitance, a capacitive load to be connected to the output of the sensor circuit 13 is increased very little by addition of the charging circuit 17.

Next, as shown in FIG. 3, according to the sensor integrated circuit 11, the signal processing circuit 15a, at time s0, starts driving of a parasitic capacitance $C_{P2}$ of the signal line 20 and the input capacitance $C_{3i}$ of the readout circuit 15b. At this time of driving, the charging circuit 18, at time s1, starts charging to the signal line 20 in response to a potential $V_{NOD}$ (corresponding to the signal $V_{COL}$ in FIG. 2) at the input 18b of the charging circuit 18. Since the fourth output resistance R4 of this charging circuit 18 is smaller than the third output resistance R3, the driving time for the signal processing circuit 15a can be reduced. Since the charging circuit 18 ends charging at time s3 before time s2 being the end point of a driving period $T_{DRV2}$ (corresponding to the driving period $T_{DRV1}$ in FIG. 2), charging or driving to the final value of a signal on the signal line 20 is performed, without assistance of the charging circuit 18, from time s3 to s2 by the signal processing circuit 15a. Hence, the accuracy of the final value (analog value) is never impaired. Since the fourth input capacitance of the charging circuit 18 is smaller than the third input capacitance, a capacitive load to be connected to the output of the signal processing circuit 15a is increased very little by addition of the charging circuit 18.

The sensor integrated circuit 11 is suitably used for a circuit including a sensor element and showing a high output resistance. An example of the sensor integrated circuit is an image sensor circuit. In the following description, for the sake of easy understanding, an image sensor circuit will be described as the sensor integrated circuit 11. The present invention, however, is not limited to an image sensor circuit. The image sensor circuit 11 includes a pixel 21 as a sensor element. The pixel 21 has a sensor element such as, for example, a photo-diode. The sensor circuit 13, in a typical example, is a pixel circuit for an image sensor. A concrete example of the pixel circuit is a MOS image sensor. Moreover, the signal processing circuit 15a, in a typical example, is an amplifier circuit for readout, an integrator circuit for readout, a correlated double sampling circuit, or the like. Moreover, the readout circuit 15b, in a typical example, is a correlated double sampling circuit, an integrator, or the like.

In a preferred example, the charging circuits 17, 18 can have the following circuit configuration. The charging circuit 17 will be described as a representative. The charging circuit 17 can include an input capacitor 23, a drive circuit 25, and a switch 27. One end 23a of the input capacitor 23 is connected to the signal line 19, and the other end 23b is connected to an input 25a of the drive circuit 25. The drive circuit 25 can be, for example, an inverting amplifier. The switch 27 is connected between an output 25b of the drive circuit 25 and the signal line 19. The switch 27 operates in response to a control signal $\phi_{F1}$, and conducts in the period $T_{CHG1}$ (time t1 to t3: T2) shorter than the driving period $T_{DRV1}$ (time t0 to t2: (T1+T2+T3)). The input capacitor 23 has, excluding a parasitic capacitance, a second input capacitance $C_{2i}$ in the charging circuit 17. A combined equivalent resistance of the output 25b of the drive circuit 25 and the switch 27 defines the second output resistance (R2). In this charging circuit 17, the input 25a of the drive circuit 25 responds to a change in potential $V_{COL1}$ on the signal line 19 received via the input capacitor 23. The end point of a charging period by the charging circuit 17 is defined by an operation of the switch 27, and the switch 27 becomes non-conductive before the end point of the driving period $T_{DRV1}$ and a receiving period $T_{RCV1}$ (when the period $T_{CHG1}$ has expired). Since the charging circuit 17 includes a capacitor-coupled amplifier, a signal on the signal line 19 can be sampled by use of the capacitor 23. Since the capacitance of the capacitor 23 ($C_{2i}$) is smaller than that of the capacitor Cs, the signal line 19 is changed speedily. Hence, the charging circuit 17, in a sampling period (T1) that is at the start of the driving period $T_{DRV1}$, can sample the value of a signal provided by the pixel 21.

Referring to FIG. 2, the operation of the signal processing circuit 15a that receives a signal from the sensor circuit 13 will be described. The pixel 21 is a pixel circuit of a MOS image sensor. A clock generating circuit 31 provides control signals and clock signals shown in FIG. 1 and FIG. 2. In the charging circuit 17, a switch 29, in response to a reset signal $\phi_{R1}$ short-circuits the input 25a and output 25b of the drive circuit 25, so that the drive circuit 25 is brought into a reset state. After a period $T_{RS1}$ (T1) for resetting has elapsed, the receiving period $T_{RCV1}$ (T2+T3) that is defined by a clock $\phi_{S1}$ is started. In the present example, the driving period $T_{DRV1}$ is started before the end point of the resetting period $T_{RS1}$. Accordingly, in the resetting period $T_{RS1}$, the charging circuit 17 is deactivated, but the sensor circuit 13 is operating. In the period (T1: t0 to t1) before a start point t1 of the receiving period $T_{RCV1}$, the sensor circuit 13 drives the input capacitance $C_{2i}$ of the charging circuit 17 and the parasitic capacitance $C_{P1}$ of the signal line 19. Since the capacitance of these combined capacitors is sufficiently smaller than the first input capacitance $C_S$, the potential of the signal line 19 quickly changes. At the end point of the resetting period $T_{RS1}$, the potential of the signal line 19 has changed almost to a target value. This potential of the signal line 19 is applied to the input of the charging circuit 17, and thus the input capacitor 23 of the charging circuit 17 can sample the potential of the signal line 19.

In the receiving period $T_{RCV1}$ (t1 to t2), the signal processing circuit 15a having an input capacitor $C_S$ is connected to the signal line 19. Since the first input capacitance $C_S$ is sufficiently greater than the combined capacitance of the input capacitance $C_{2i}$ of the charging circuit 17 and the parasitic capacitance $C_{P1}$ of the signal line 19, a charge moves from the combined capacitor to the signal processing circuit 15a to cause charge sharing, and the potential of the signal line 19 changes according to the amount of moved charge. This potential in the signal line 19 is applied to the input of the charging circuit 17 released from a reset state. In a preferred example, the charging circuit 17 starts charging in response to a change in potential due to charge sharing. In the period (T2: t1 to t3) subsequent to the period T1, both of the charging circuit 17 and the sensor circuit 13 drive the signal processing circuit 15a. However, since the capacitive load (input capacitor $C_S$) of the signal processing circuit 15a is greater than the combined capacitance, the potential of the signal line 19 changes slower than the changing speed in the period T1. At time t3, the switch 27 of the charging circuit 17 becomes non-conductive. In the period (T3: t3 to t2) subsequent to the period T2, the sensor circuit 13 again drives the signal processing circuit 15a to change the potential to that of the signal line 19 and the input capacitor of the signal processing circuit 15a so as to be a final value. In a concrete image sensor circuit, the capacitance ratio ($C_{1i}/(C_{2i}+C_{P1})$) is on the order of, for example, 3 to 5.

The sensor circuit (for example, the pixel 21) 13 drives the signal line 19 in the driving period $T_{DRV1}$ to change the potential $V_{COL}$ of the signal line 19 from an initial value V1 to a final value V2. With regard to the potential $V_{COL}$ of the signal line 19, a change from the initial value V1 to a driven value V31 and a change from a second driven value V4 to the final value V2 are performed by the sensor circuit (for example, the pixel 21) 13, while a change from a driven value V32 to the second driven value V4 is performed by the charging circuit 17 and the sensor circuit (for example, the pixel 21) 13.

In the period $T_{CHG1}$, the charging circuit 17 assists driving or charging of the signal line 19, and as a result of this, the speed of charging to the relatively large capacitor (first capacitance $C_{1i}$) $C_S$ of the signal processing circuit 15a can be increased. Hence, in the period $T_{CHG1}$, the charging circuit 17 supplies the capacitors $C_{P1}$ and $C_S$ with a charge not only to change the potential of the signal line 19 from the driven value V32 to the second driven value V4, but also to change a potential $V_{SMPL1}$ on the capacitor $C_S$ of the signal processing circuit 15a. Prior to the start of a charging operation of the charging circuit 17, the sensor circuit (for example, the pixel 21) 13 supplies the capacitors $C_{P1}$ and $C_S$ with a charge to change the potential $V_{COL}$ of the signal line 19 from the initial value V1 to the driven value V31, and the charging circuit 17 can sample this value. After the charging operation of the charging circuit 17 ends, the sensor circuit (for example, the pixel 21) 13 supplies the capacitors $C_{P1}$ and $C_S$ with a charge not only to change the potential $V_{COL}$ of the signal line 19 from the second driven value V4 to the final value V2, but also to change the potential $V_{SMPL1}$ on the capacitor $C_S$ of the signal processing circuit 15a, thereby achieving driving to an accurate final value (analog value).

Then, referring to FIG. 3, the operation of the readout circuit 15b that receives a signal from the signal processing circuit 15a will be described. The clock generating circuit 31 provides control signals and clock signals shown in FIG. 2 and FIG. 3. In the following description, a signal is taken into the capacitor $C_{3i}$ of the readout circuit 15b. In the charging circuit 18, a switch 29, in response to a reset signal $\phi_{R2}$, short-circuits the input 25a and output 25b of the drive circuit 25, so that the drive circuit 25 is brought into a reset state. After a period $S_{RS2}$ (S1) for resetting has elapsed, a receiving period $T_{RCV2}$ (S2+S3) that is defined by a clock $\phi_{S2}$ is started. In the present example, the driving period $T_{DRV2}$ is started before the end point of the resetting period $T_{RS2}$. Accordingly, in the resetting period $T_{RS2}$, the charging circuit 18 is deactivated, but the signal processing circuit 15a is operating. In the period (S1: s0 to s1) before a start point s1 of the receiving period $T_{RCV2}$, the signal processing circuit 15a drives the input capacitance $C_{4i}$ of the charging circuit 18 and the parasitic capacitance $C_{P2}$ of the signal line 20. Since the capacitance of these combined capacitors is sufficiently smaller than the first input capacitance $C_{3i}$, the potential of the signal line 20 quickly changes. At the end point of the resetting period $T_{RS2}$, the potential of the signal line 20 has changed almost to a target value. This potential of the signal line 20 is applied to the input of the charging circuit 18, and thus the input capacitor 23 of the charging circuit 18 can sample the potential of the signal line 20.

In the receiving period $T_{RCV2}$ (s1 to s2), the readout circuit 15b having an input capacitor $C_{3i}$ is connected to the signal line 20. Since the input capacitance $C_{3i}$ is sufficiently greater than the combined capacitance of the input capacitance of the charging circuit 18 and the parasitic capacitance $C_{P2}$ of the signal line 20, a charge moves from the combined capacitor to the readout circuit 15b to cause charge sharing, and the potential of the signal line 20 changes according to the amount of moved charge. This potential in the signal line 20 is applied to the input of the charging circuit 18 released from a reset state. In a preferred example, the charging circuit 18 starts charging in response to a change in potential due to charge sharing. In the period (S2: s1 to s3) subsequent to the period S1, both of the charging circuit 18 and the signal processing circuit 15a drive the readout circuit 15b. However, since the capacitive load (input capacitor $C_{3i}$) of the readout circuit 15b is greater than the combined capacitance, the potential of the signal line 20 changes slower than the changing speed in the period S1. At time s3, the switch 27 of the charging circuit 18 becomes non-conductive. In the period (S3: s3 to s2) subsequent to the period S2, the signal processing circuit 15a again drives the readout circuit 15b to change the potential to that of the signal line 20 and the input capacitor of the readout circuit 15b so as to be a final value.

The signal processing circuit 15a drives the signal line 20 in the driving period $T_{DRV2}$ to change the potential $V_{NOD}$ of the signal line 20 from an initial value U1 to a final value U2. With regard to the potential $V_{NOD}$ of the signal line 20, a change from the initial value U1 to a driven value U31 and a change from a driven value U4 to the final value U2 are performed by the signal processing circuit 15a, while a change from a driven value U32 to the driven value U4 is performed by the charging circuit 18 and the signal processing circuit 15a.

In the period $T_{CHG2}$, the charging circuit 18 assists driving or charging of the signal line 20, and as a result of this, the speed of charging to the relatively large capacitance $C_{3i}$ of the readout circuit 15b can be increased. Hence, in the period $T_{CHG2}$, the charging circuit 18 supplies the capacitors $C_{P2}$ and $C_{3i}$ with a charge not only to change the potential of the signal line 20 from the driven value U32 to the driven value U4, but also to change a potential $V_{SMPL2}$ on the capacitor $C_{3i}$ of the readout circuit 15b. Prior to the start of a charging operation of the charging circuit 18, the signal processing circuit 15a supplies the capacitor $C_{P2}$ with a charge to change the potential $V_{NOD}$ of the signal line 20 from the initial value U1 to the driven value U31, and the charging circuit 18 can sample this value. After the charging operation of the charging circuit 18 ends, the signal processing circuit 15a supplies the capacitor $C_{P2}$ with a charge not only to change the potential $V_{NOD}$ of the signal line 20 from the driven value U4 to the final value U2, but also to change the potential $V_{SMPL2}$ on the capacitor $C_{3i}$ of the readout circuit 15b, thereby achieving driving to an accurate final value (analog value).

Referring again to FIG. 2, the change characteristic line $V_{MDFY1}$ of the potential $V_{SMPL1}$ of the signal processing circuit 15a changes more quickly than the change characteristic line $V_{CONV1}$ of the potential on the capacitor $C_S$ of the signal processing circuit 15a in an image sensor circuit using no charging circuit 17. Moreover, referring to FIG. 3, the change characteristic line $V_{MDFY2}$ of the potential $V_{SMPL2}$ of the readout circuit 15b changes more quickly than the change characteristic line $V_{CONV2}$ of the potential of the readout circuit 15b in an image sensor circuit using no charging circuit 18. Therefore, the signal transmission time in the image sensor circuit is reduced by the charging circuits 17, 18 without impairing the accuracy of the final value. In an example of the image sensor circuit, the input capacitance of the charging circuit 17 is, for example, 0.5 picofarads, the input capacitance of the signal processing circuit 15a is, for example, 5 picofarads, and the parasitic capacitance of the column line 19 and the pixel 21 is, for example, 1 picofarad. The output resistance Rs of the pixel 21 is, for example, 50 kiloohms, and the output resistance R2 of the charging circuit 17 is, for example, 5 kiloohms.

In an image sensor circuit model using no charging circuit 17 (charging circuit 18), the capacitor Cs is charged with the output resistance Rs (R3). A settling time $t_{st}$ is, by using an error $e_{st}$ and a time constant $\tau_s (=Cs \times Rs)$, expressed as:

$$t_{st} = -\tau_S \ln(e_{st}) \quad (1), \text{ and}$$

in order to attain $e_{st} = 10^{-3}$, $t_{st} = 6.9 \times \tau_s$.

In a circuit to realize speeding-up of sampling, first, a signal value from a sensor element is sampled to a capacitor Ca (sampling capacitance $C_{2i}$ of a changing circuit, $C_{P1} < C_{2i}$) smaller than the input capacitance $C_{1i}$ of a signal processing circuit. The signal processing circuit 15a (readout circuit 15b) is connected to the input and output of the charging circuit 17 (charging circuit 18) having sufficient driving ability, and by its driving responding to the sampling value, the capacitor Cs is charged to a value close to a final value of an analog value. For charging to an accurate value, finally, driving in the charging circuit 17 is stopped, and the capacitor Cs is charged by only the pixel 21. By using such a driving method, the settling time of the above-described three processes is determined as in the following formula:

$$t_{st} = -\tau_{a1} \ln(e_{st}) - \tau_{a2} \ln(e_{st2}) - \tau_s \ln(e_{st}/e_{st2}) \quad (2)$$

$$\tau_{a1} = C_{2i} \times Rs$$

$$\tau_{a2} = Cs/gm$$

gm: transconductance of the output of the charging circuit

The charging circuit 17 has the above-described transconductance gm in its operation range.

$$t_{st} = -\tau_s \times ((C_{2i}/Cs) \times \ln(e_{st}) + (1/(Rs \times gm)) \times \ln(e_{st2}) + \ln(e_{st}/e_{st2})) \quad (3)$$

The first term of the right-hand side of formula (3) means a time for which the input capacitor of the charging circuit 17 (charging circuit 18) is charged with a pixel signal, the second term means a time for which the sampling capacitor Cs is charged by using the charging circuit 17 (charging circuit 18), and the third term means a time for which the sampling capacitor Cs is charged by the pixel 21 by a difference between a value by the charging circuit 17 (charging circuit 18) and a final value of an analog value. For example, if $C_{2i}/Cs=0.1$, $Rs\times gm=10$, $e_{st2}=10^{-2}$, and $e_{st}=10^{-3}$, $t_{st}=3.45\times\tau s$, so that sampling is speeded up twice as fast as when this circuit is not used ($t_{st}=6.9\times\tau s$).

Figure 4:
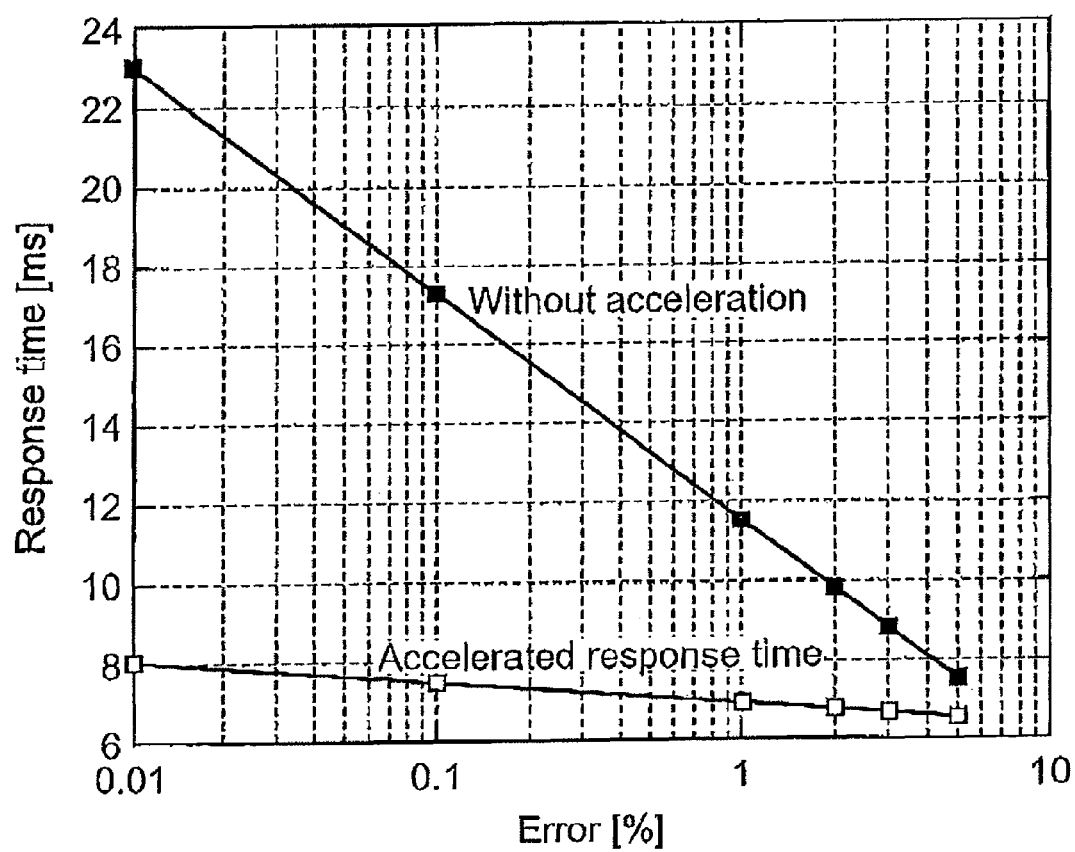
FIG. 4 is a drawing showing simulation results of speeding-up by an example according to the present embodiment.

This circuit can be used for the outputs of various sensors, and in the case of application to a noise cancellation circuit to be integrated into a CMOS image sensor column, a pixel output, in a source follower circuit, is connected to a common vertical signal line, and its parasitic capacitance is made sufficiently smaller than the capacitances $C_S$, $C_R$ being sampling capacitances, so that sufficient speeding-up is performed by an amplifier that accelerates this charging. In this case, simulation results of speeding-up by an example according to the present embodiment are shown in FIG. 4. With an error of 0.1% between a target voltage value and a drive voltage, the response time was 17.25 ms in a conventional circuit using no charging circuit, but it has changed to 7.48 ms in the charging circuit according to the present embodiment.

Thus, by using the charging circuit 17 (charging circuit 18), the driving time can be reduced. The sensor circuit described in the foregoing can be applied, without limitation to image sensors, to various sensors that can be integrated together into semiconductor circuits besides pixels. Example of the sensors to which the sensor circuit is applicable include a distance sensor, a magnetic sensor, an acceleration sensor, and a pressure sensor. In the following description of embodiments, when the sensor integrated circuit, in place of the pixel circuit, includes a detection circuit including a sensor element different from a pixel, the detection circuit can include the sensor element and an amplifier circuit.

Figure 5:
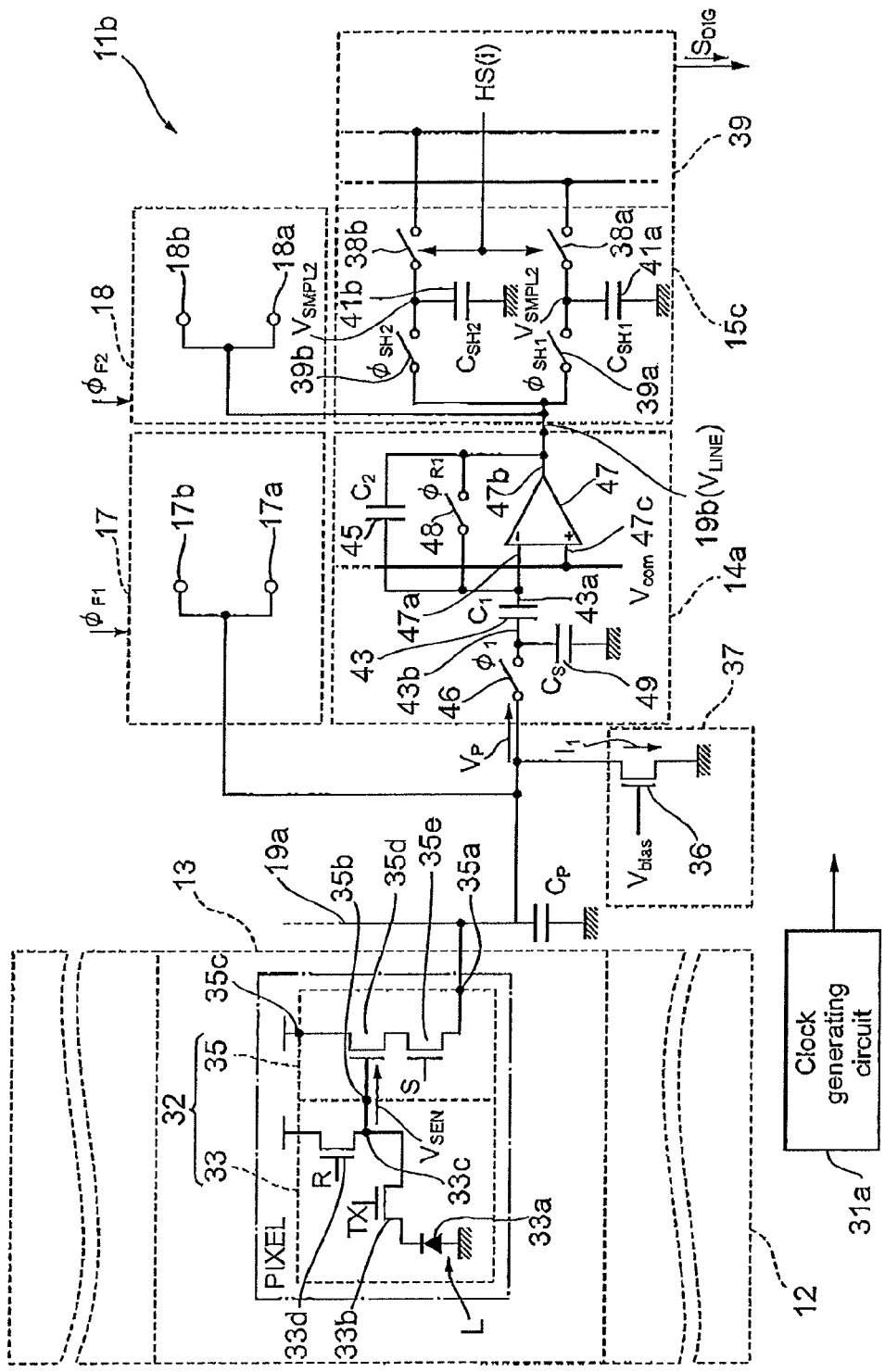
FIG. 5 is a drawing showing another example of an image sensor circuit according to the present embodiment.
Figure 6:
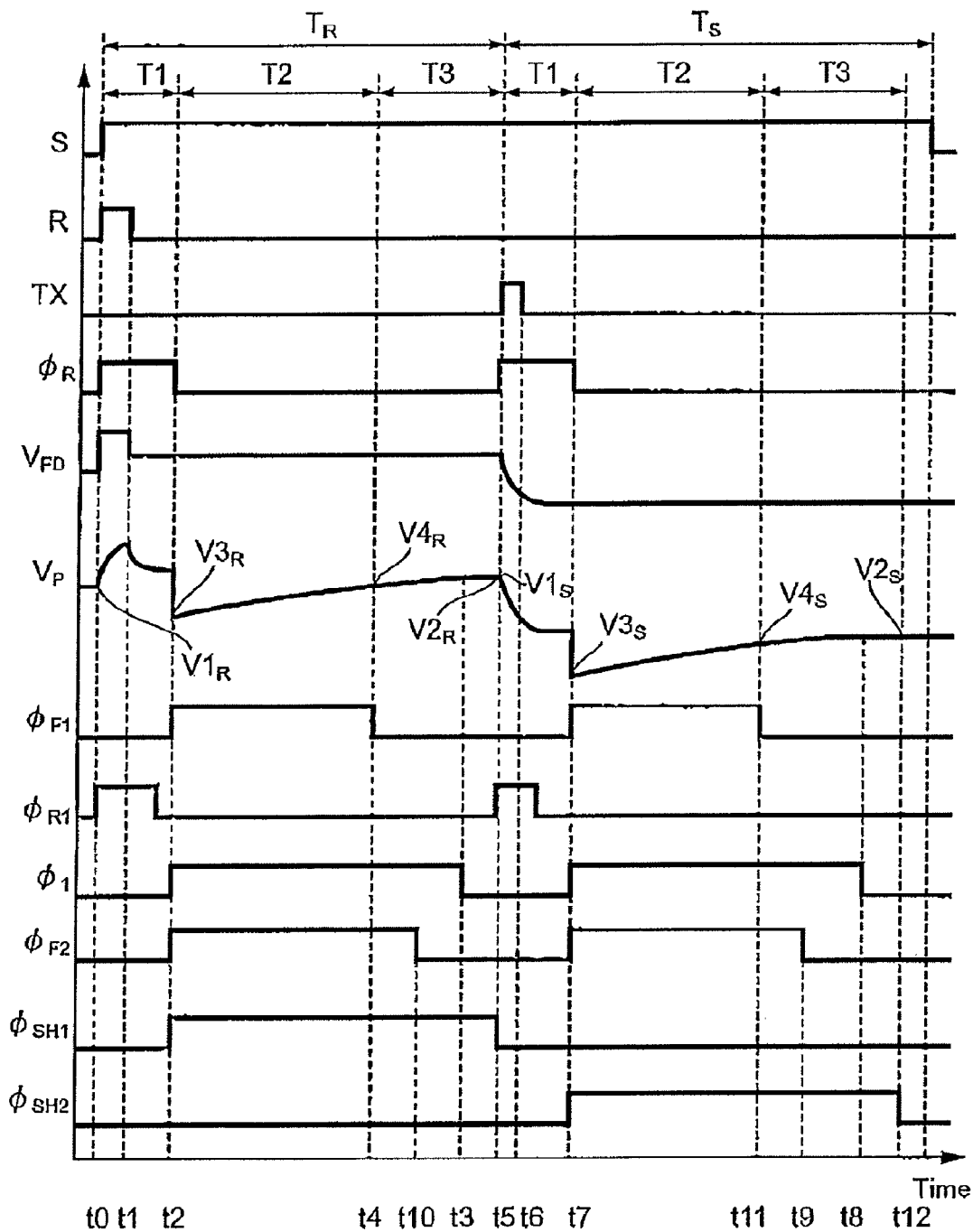
FIG. 6 shows a timing chart for the image sensor circuit shown in FIG. 5.

In the embodiment to be described in the following, the present circuit is applied to a noise cancellation circuit to be integrated into a column of a MOS image sensor array. FIG. 5 is a drawing showing another example of an image sensor circuit according to the present embodiment. FIG. 6 is a drawing showing a timing chart for the image sensor circuit shown in FIG. 5. The output circuit of a pixel is a source follower circuit, which is connected to a column line (common vertical signal line). If the parasitic capacitor $C_{P1}$ of the column line and the input capacitor $C_{2i}$ are sufficiently smaller than the input capacitor Cs of a signal processing circuit, sufficient speeding-up is obtained by using a charging circuit that accelerates charging.

As the sensor circuit 13 of an image sensor circuit 11b, a pixelcircuit 32 is used. The pixel circuit 32 has a sensor unit 33 and an amplifying unit 35, and the sensor unit 33 includes a sensor element 33a. The sensor element 33a includes a photoelectric conversion element that generates a photocurrent in response to light L, and this is, for example, a photodiode. The amplifying unit 35 drives a column line 19a in response to a signal $V_{SEN}$ from the sensor element 33a. The amplifying unit 35 includes a signal output 35a, a control input 35b, and a power supply terminal 35c. The signal output 35a of the amplifying unit 35 has a first output resistance (Rs).

A cell of a CMOS image sensor can be mentioned as an example of the pixel 21. In the cell of the CMOS image sensor, as the sensor element 33a of FIG. 5, for example, a buried photodiode is used. The sensor unit 33 includes a transmission transistor 33b connected between the sensor element 33a and the control input 35b of the amplifying unit 35 and a reset transistor 33d for resetting a storage node 33c. The gate of the transmission transistor 33b receives an X transmission control signal TX, and the gate of the reset transistor 33d receives a reset signal R. The storage node 33c is connected to the gate of a amplifying transistor 35d. The amplifying unit 35 includes the amplifying transistor 35d and a selection transistor 35e connected in series, and a current that flows to the amplifying transistor 35d flows to the selection transistor 35e. The gate of the selection transistor 35e receives a selection signal S. The pixel circuit 32 provides a first signal indicating a reset level set by a reset signal, and provides a second signal indicating a signal level corresponding to the size of a light signal L received by the sensor element 33a.

As the signal processing circuit 15a in FIG. 1, an amplifier 14a is used in FIG. 5, and a column line 19a is used as a signal line (for example, the signal line 19). As the readout circuit 15b in FIG. 1, a correlated double sampling circuit 15c is used in FIG. 5, and a signal line 19b is used as another signal line (for example, the signal line 20). To an output of the amplifier 14a, the correlated double sampling circuit 15c is connected via the signal line 19b. The column line 19a is connected to the pixel circuit 32 within a pixel array 12 of the image sensor. The pixel circuit 32, the amplifier 14a, a charging circuit 17, and a bias circuit 37 are connected to each other via the column line 19a. Control signals and clocks to be mentioned in the following description are provided by, for example, a clock generating circuit 31a.

In the correlated double sampling circuit 15c, a first capacitor 41a stores the first signal (reset level of the pixel circuit 32). A first switch 39a is connected between the first capacitor 41a and the signal line 19b. A second capacitor 41b stores the second signal (signal level of the pixel circuit 32). A second switch 39b is connected between the second capacitor 41b and the signal line 19b. The input capacitance of the correlated double sampling circuit 15c is greater than the input capacitance of the charging circuit 18. The input capacitance of the correlated double sampling circuit 15c is, for example, 5 picofarads.

In the image sensor circuit 11b, the amplifier 14a is connected to the column line 19a. The input capacitance of the charging circuit 17 is smaller than the input capacitance of the amplifier 14a. The input capacitance of the amplifier 14a is, for example, 5 picofarads. Also in the image sensor circuit 11b, the column line 19a has a parasitic capacitance $C_P$, and the output resistance R4 of the charging circuit 18 is smaller than the output resistance (R3 in FIG. 1) of the signal processing circuit 15a in FIG. 1, that is, the amplifier 14a in the present example shown in FIG. 5.

The amplifier 14a can include third and fourth capacitors 43, 45 and an operational amplifier circuit 47. One end 43a of the third capacitor 43 is connected to one input (for example, an inverting input) 47a of the operational amplifier circuit 47. The other end 43b receives a signal from the input of the amplifier 14a via a switch 46, and is connected to a sampling capacitance 49. The fourth capacitor 45 is connected between the input 47a of the operational amplifier circuit 47 and an output (for example, a non-inverting output) 47b, and the other input (for example, a non-inverting input) 47c of the operational amplifier circuit 47 is connected to a common line $V_{COM}$. The ratio of capacitances (C1, C2) between the third and fourth capacitors 43, 45 defines a gain of the amplifier 14a. The operational amplifier circuit 47 operates together with the third and fourth capacitors 43, 45 to amplify a signal Vp received at the input of the amplifier 14a. The amplifier 14a includes a switch 48 that resets the input and output of the operational amplifier circuit 47 in response to the clock $\phi_{R1}$ shown in FIG. 5.

The operation of the image sensor circuit 11b will be described. As shown in FIG. 6, the entire readout period includes a reset level readout period $T_R$ and a signal level readout period $T_S$. In order to read out information from the pixel circuit 32, a bias circuit 37 is used. In the readout periods $T_R$, $T_S$, the bias circuit 37 is active. To the gate of a transistor 36, a bias voltage is applied, and the bias circuit 37 operates as a current source to supply a current $I_1$. When the pixel circuit 32 is selected, a current according to the potential of the storage node 33c flows to the amplifying unit 35 and the bias circuit 37 to charge the column line 19a.

In the period $T_R$, the selection transistor 35e of the amplifying unit 35 conducts in response to a selection signal S. A driving period starts at time t0 in FIG. 6. Moreover, the pixel circuit 32 is supplied with a reset signal R, whereby the potential $V_{FD}$ of the diffusion node 33c is set to a reset level. At time t1, the reset signal R is cancelled, so that reset noise is produced in the diffusion node 33c. In this reset level readout, the column line 19a is driven from an initial value $V1_R$ to a final value $V2_R$. In the period of time t0 to t2, in the present example, the input 25a and output 25b of the drive circuit 25 of the charging circuit 17 are reset in response to the clock $\phi_R$ shown in FIG. 6. Around the end point of the resetting period (for example, time t2), the potential of the column line 19a has reached the final value or almost the final value. By time t2, this column line potential is received by the input of the charging circuit 17 to complete sampling. The charging circuit 17 becomes active at time t2.

At time t2, the switch 46 conducts in response to a clock $\phi_1$, so that the capacitors 43, 49 are connected to the column line 19a. At time t3, the switch 46 becomes non-conductive. Moreover, the amplifier circuit 47 operates in response to a signal received at the input 47a. An amplified signal is supplied to the signal line 19b of the amplifier 14a.

As a result of conduction of the switch 46, a large holding capacitor 49 is connected to the column line 19a. Due to charge sharing with the parasitic capacitor Cp of the column line 19a and the input capacitor 49, the potential $V_P$ of the column line 19a once greatly changes at time t2 to become a value $V3_R$. The charging circuit 17 is activated at time t2 to assist a change in potential of the column line 19a. The charging circuit 17 released from resetting, in response to a temporary change in potential of the column line 19a, starts charging via the output of the second output resistance (R2 of FIG. 1). After time t2, the amplifying unit 35 of the pixel circuit 32 and the charging circuit 17 drive the column line 19a and the amplifier 14a via the outputs of the first and second output resistances, respectively. Due to this driving, the potential of the column line 19a rises from the potential $V3_R$. The driving assistance by the charging circuit 17 ends at time t4 before time t3. At time t4, the column line 19a is driven to a potential $V4_R$. Thereafter, the pixel circuit 32 solely drives the column line 19a and the amplifier 14a via the first output resistance (Rs of FIG. 1), and charges the same by a difference between the final value $V2_R$ and the current value $V4_R$. The final value $V2_R$ is achieved by the pixel circuit 32 prior to time t3 where the period expires.

In the period $T_S$, the selection transistor 35e conducts at time t5. Moreover, the pixel circuit 32 is supplied with a transmission signal TX, so that the transmission transistor 33b conducts. A sensor signal is transmitted to the diffusion node 33c, whereby the potential $V_{FD}$ is set to a signal level. At time t6, the transmission signal TX is cancelled, so that the signal level is defined in the diffusion node 33c. In response to a value of this signal level, the column line 19a is driven from an initial value $V1_S$ to a final value $V2_S$. The pixel circuit 32 drives the column line 19a of the initial potential $V1_S$ via the output of the first output resistance. In the period of time t5 to t7 where the capacitor of the amplifier 14a is not yet connected to the column line 19a, in the present example, the input 25a and output 25b of the drive circuit 25 of the charging circuit 17 are again reset in response to the clock $\phi_R$ shown in FIG. 6. Around the end point of the resetting period (for example, time t7), the potential of the column line 19a has reached the final value or almost the final value. The charging circuit 17 samples the potential of the column line 19a. At a time no earlier than time t7, the switch 46 of the amplifier 14a conducts in response to the clock $\phi_1$, and the switch 46 becomes non-conductive at time t8. As a result of conduction of the switch 46, a large holding capacitor 49 is connected to the column line 19a. Due to charge sharing with the parasitic capacitor of the column line 19a and the capacitor 49, the potential $V_P$ of the column line 19a once greatly changes. Moreover, the charging circuit 17 is activated at time t7. When the column line 19a has reached the potential $V3_S$, driving of the charging circuit 17 is started, and the pixel circuit 32 and the charging circuit 17 drive the column line 19a and the amplifier 14a via the first and second output resistances, respectively. The driving assistance by the charging circuit 17 ends at time t11 before time t8. At time t11, the column line 19a is driven to a potential $V4_S$. Thereafter, the pixel circuit 32 solely drives the column line 19a and the amplifier 14a via the first output resistance, and charges the same by a difference between the current value $V4_S$ and the final value $V2_S$. Arrival at the final value $V2_S$ is completed by the pixel circuit 32 prior to time t8.

According to the image sensor circuit 11b, the driving time of a large capacitive load can be reduced. The first and second signals stored in the correlated sampling circuit 15c are supplied to a next circuit 39 via switches 38a, 38b that conduct in response to a signal HS(i). This circuit 39 performs A/D conversion of these signals to generate digital signals $S_{DIG}$. Moreover, the circuit 39 is provided for every column.

Since the signal processing circuit includes the correlated double sampling circuit 15c, in either driving of the reset level and signal level, a storing capacitor (a first capacitor 39a or a second capacitor 39b) is connected to the signal line 19b. The capacitors 39a, 39b of the correlated double sampling circuit 15 have relatively large capacitances in order to reliably hold the first and second signals corresponding to the reset level and signal level. According to this image sensor circuit 11b, the charging circuit 17 assists driving of the column line 19a by the amplifying unit 35 of the pixel circuit 32. Since the charging circuit 17 ends charging before the end point of the driving period, charging or driving to the final value is performed by the amplifying unit 33. Therefore, by using the amplifying unit 33 of the pixel circuit 32, the time to charge the parasitic capacitance of the column line 19a and the capacitor of the correlated double sampling circuit 15c from the initial value to the final value can be reduced.

The charging circuit 17 in FIG. 5 is in a reset state in a resetting period due to a reset signal $\phi_R$ in FIG. 6, and the potential of the column line 19a is sampled in this period. The amplifier 14a is connected to the column line 19a in response to the clock $\phi_1$ after the resetting period. Therefore, the potential of the column line 19a, due to a charge movement into the sampling capacitor 49 (capacitance Cs) of the amplifier 14a, greatly fluctuates temporarily. Since the charging circuit 17, which is active in the period T2, thus starts charging in response to this fluctuation, and in the period T3, the sampling capacitor 49 is driven by the pixel circuit 32. According to this image sensor circuit 11b, the signal transmission time from the pixel circuit 32 to the amplifier 14a is reduced without impairing the accuracy of the final value. The amplifier 14a processes a signal received from the pixel circuit 32 via the column line 19a. The sampling capacitor 49 substantially defines an input capacitance of the amplifier 14a. Moreover, an increase in consumption current in the amplifier is no longer necessary because the signal transmission time is reduced. Moreover, a design target of the amplifier can be set for an improvement in characteristics (for example, an effect to reduce input-referred noise of the amplifier) other than a reduction in the signal transmission time.

In the image sensor circuit 11b, the output of the amplifier 14a serving as a signal processing circuit is connected to the correlated double sampling circuit 15c via the signal line 19b. Alternatively, an integrator (for example, the integrator described in the embodiment) can be used in place of the correlated double sampling circuit 15c. The correlated double sampling circuit 15c can store readout values corresponding to the reset level and signal level received via the signal line 19b from the amplifier 14a. The output of the amplifier 14a and the input of the correlated double sampling circuit 15c are connected to the charging circuit 18 via the signal line 19b. The charging circuit 18 can have the same circuit configuration as that of, for example, the charging circuit 17. However, the circuit structure of the charging circuit 18 is not limited to that of a specific circuit. For example, the input 18b of the charging circuit 18 has an input capacitance smaller than the input capacitance of the correlated double sampling circuit 15c, and the output 18a of the same has an output resistance smaller than the output resistance of the amplifier 14a. The charging circuit 18, in response to the potential at the input 18b of the charging circuit 18, starts charging to the signal line 19b via its output 18a and ends charging before the end point of the driving period. The charging circuit 18 operates in periods (t2 to t10, t7 to t9) in response to the clock $\phi_{F2}$ shown in FIG. 6, in place of the clock $\phi_{F1}$ of the charging circuit 17. In the present example, active periods (t2 to t10, t7 to t9) of the charging circuit 18 are longer than the active periods (t2 to t4, t7 to t11) of the charging circuit 17, and shorter than the periods (t2 to t3, t7 to t8) for which the sampling switch 46 of the amplifier circuit 15b is conductive in response to the clock $\phi_1$.

Then, description will be continued of changes in potential of the signal line 19b. The potential of the signal line 19b changes in the three periods S1, S2, S3 shown in FIG. 3 that are similar to the periods T1, T2, T3 shown in FIG. 6 and used for driving of the column line 19a. The amplifier 14a changes a potential $V_{LINE}$ of the signal line 19b from the initial value (U1 of FIG. 3) to the final value (U2 of FIG. 3) in the periods (S1, S2, S3) corresponding to the driving periods (t0 to t5, t5 to t12) of FIG. 6. In the periods (t0 to t2, t5 to t7) of FIG. 6, the charging circuit 18 is in a reset state, and its input 18b receives the potential of the signal line 19b. The amplifier 14a drives the signal line 19b and the input 18b of the charging circuit 18, so that the potential of the signal line 19b changes to the driven value (U31 of FIG. 3). In the periods (t2 to t5, t7 to t12) of FIG. 6, the correlated double sampling circuit 15c is connected to the signal line 19b in response to clocks $\phi_{SH1}$ or $\phi_{SH2}$. The charging circuit 18 operates in response to a change in potential of the signal line 19b. In the charging periods (t2 to t10, t7 to t9) of FIG. 6, the charging circuit 18 assists driving or charging of the signal line 19b, and supplies the parasitic capacitor of the signal line 19b and the relatively large capacitor (capacitance $C_{SH1}$ or $C_{SH2}$ of FIG. 5) of the correlated double sampling circuit 15c with a charge not only to change the potential of the signal line 19b from the first driven value (U32 of FIG. 3) to the second driven value (U4 of FIG. 3), but also to change the potential $V_{SMPL2}$ on the capacitor 41a (or capacitor 41b) of the correlated double sampling circuit 15c. When the assist of the charging circuit 18 is stopped in response to the clock $\phi_{F2}$, the signal line 19b is at a potential (U4 of FIG. 3). In the periods (t10 to t5, t9 to t12) of FIG. 6, the amplifier 14a supplies the parasitic capacitor of the signal line 19b and the capacitor (capacitance $C_{SH1}$ or $C_{SH2}$) of the correlated double sampling circuit 15c with a charge not only to change the potential $V_{LINE}$ of the signal line 19b from the second driven value (U4 of FIG. 3) to the final value (U2 of FIG. 3), but also to change the potential $V_{SMPL2}$ on the capacitor (capacitance $C_{SH1}$ or $C_{SH2}$) of the correlated double sampling circuit 15c, thereby achieving driving to an accurate final value (analog value). That is, with regard to the potential $V_{LINE}$ of the signal line 19b, a change from the initial value (U1 of FIG. 3) to the driven value (U31 of FIG. 3) is performed by the amplifier 14a. With regard to the potential $V_{LINE}$ of the signal line 19b and the potential $V_{SMPL2}$ on the large capacitor of the readout circuit, a change from the driven value (U4 of FIG. 3) to the final value (U2 of FIG. 3) is performed by the amplifier 14a, while a change from the driven value (U32 of FIG. 3) to the driven value (U4 of FIG. 3) is performed by the charging circuit 18 and the amplifier 14a.

Next, a modification of the image sensor circuit 11b shown in FIG. 5 will be described. In the image sensor circuit 11b, the amplifier 14a reads out a signal from the pixel circuit 32 by using assistance of the charging circuit 17, and the correlated double sampling circuit 15c samples a signal from the amplifier 14a by using assistance of the charging circuit 18. However, in the modification of the image sensor circuit 11b, the charging circuit 18 can be used without using the charging circuit 17. Alternatively, in the modification of the image sensor circuit 11b, the charging circuit 17 can be used without using the charging circuit 18.

Figure 7:
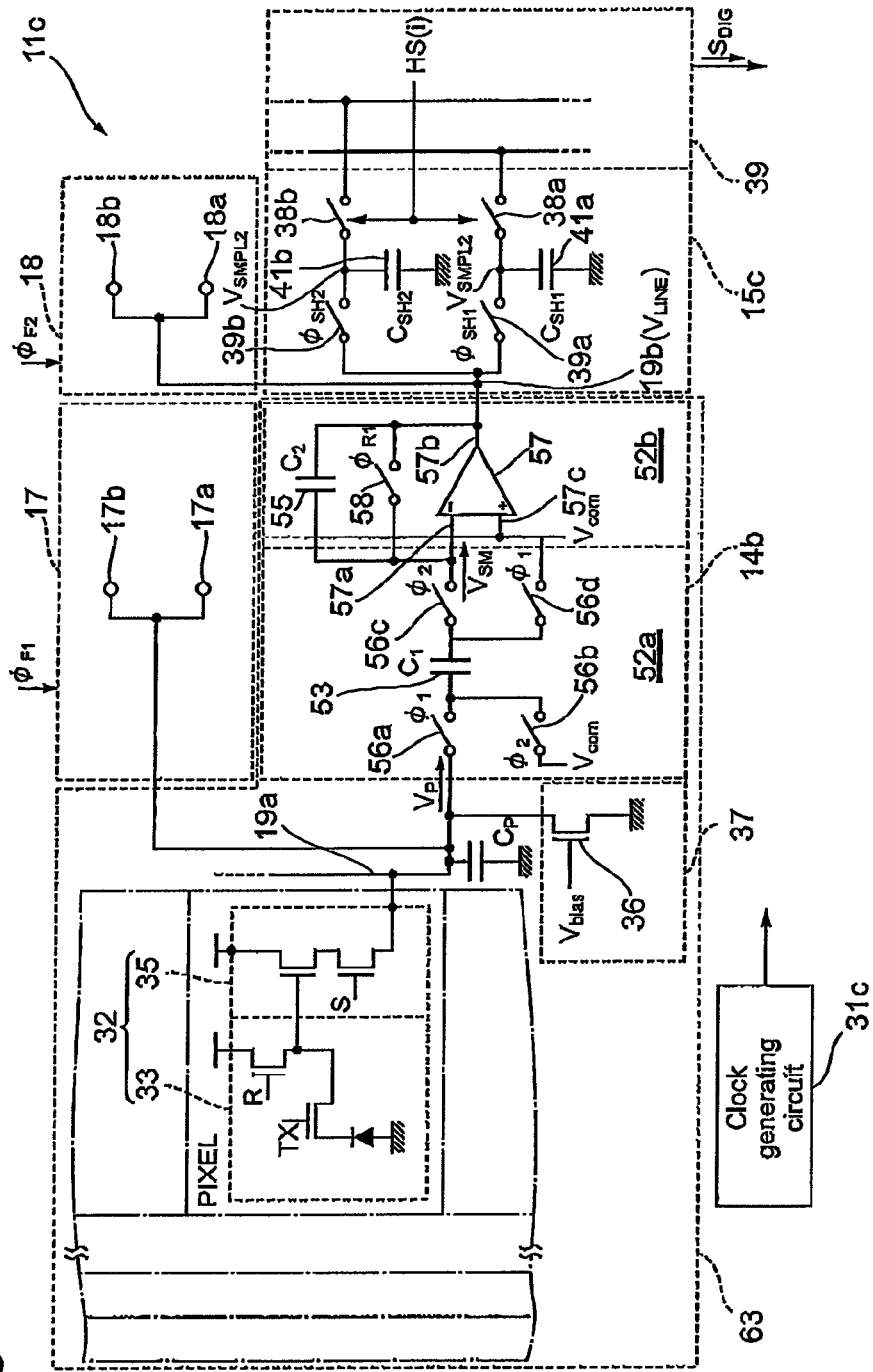
FIG. 7 is a drawing showing another example of a sensor integrated circuit for an image sensor circuit according to the present embodiment.
Figure 8:
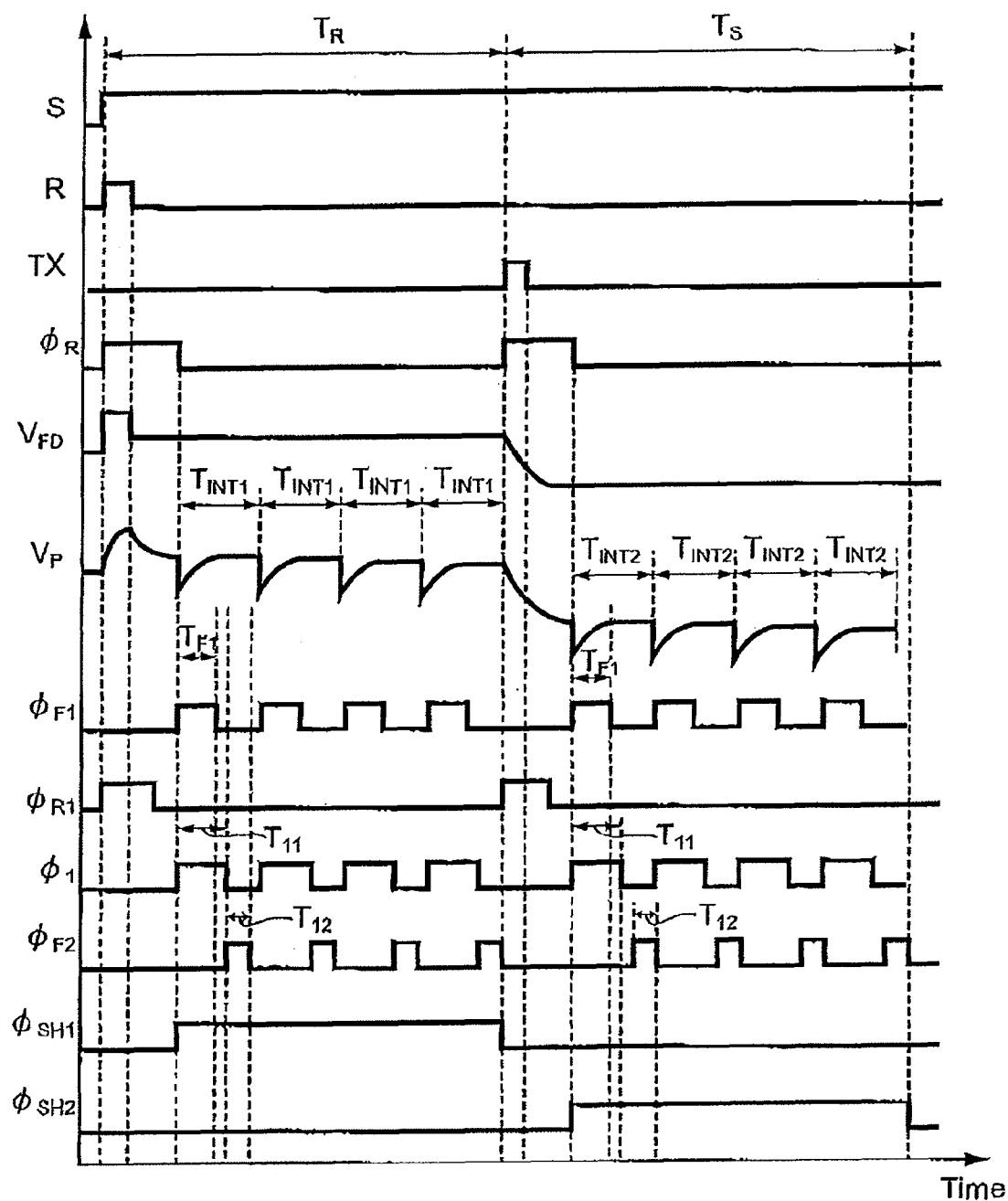
FIG. 8 is a drawing showing a timing chart of the sensor integrated circuit for the image sensor circuit shown in FIG. 7.

FIG. 7 is a drawing showing another example of an image sensor circuit according to the present embodiment. FIG. 8 is a drawing showing a timing chart for the image sensor circuit shown in FIG. 7. The image sensor circuit 11c includes an integrator 14b in place of the amplifier 14a of the image sensor circuit 11b. In the image sensor circuit 11c, a pixel circuit 32 and a bias circuit 37 are used, an integrator 14b is used as the signal processing circuit 15a of FIG. 1, a column line 19a is used as a signal line (for example, the signal line 19), and a signal line 19b is used as another signal line (for example, the signal line 20). To an output of the amplifier 14b, a correlated double sampling circuit 15c is connected via the signal line 19b. The pixel circuit 32, the integrator 14b, a charging circuit 17, and the bias circuit 37 are connected to each other via the column line 19a. The column line 19a connects pixels within a pixel array of the image sensor. Control signals and clocks to be mentioned in the following description are provided by, for example, a clock generating circuit 31c.

In the image sensor circuit 11c, the integrator 14b is connected to the column line 19a in place of the amplifier 14a of the image sensor circuit 11b. The input capacitance of the charging circuit 17 is smaller than the input capacitance of the integrator 14b. The input capacitance of the integrator 14b is, for example, 5 picofarads. Also in the image sensor circuit 11c, as in the image sensor circuit 11b, the column line 19a has a parasitic capacitance $C_P$, and the output resistance R2 of the charging circuit 17 is smaller than the output resistance Rs of the pixel circuit 32. The charging circuit 17 has already sampled the potential of the column line 19a before the start of an integration period.

The integrator 14b includes a sampling circuit 52a that samples a signal $V_P$ from the input of the integrator 14b and an integrator circuit 52b that integrates a signal $V_{SM}$ sampled by the sampling circuit 52a. The sampling circuit 52a includes a holding capacitor 53 and switches 56a to 56d. The switch 56a is connected between one end of the holding capacitor 53 and the column line 19a, the switch 56b is connected between one end of the holding capacitor 53 and a common line $V_{COM}$, the switch 56c is connected between the other end of the holding capacitor 53 and the input of the integrator circuit 52b, and the switch 56d is connected between the other end of the holding capacitor 53 and a common line $V_{COM}$. The integrator circuit 52b includes an operational amplifier circuit 57 and a capacitor 55. The capacitor 55 is connected between an input (for example, an inverting input) 57a and an output (for example, a non-inverting output) 57b of the operational amplifier circuit 57. The other input (for example, a non-inverting input) 57c of the operational amplifier circuit 57 receives a common signal from the common line $V_{COM}$. The integrator circuit 52b includes a resetting switch 58 that operates in response to the clock $\phi_{R1}$ of FIG. 7 and FIG. 8, and is connected between the input 57a and output 57b of the operational amplifier circuit 57.

In the sampling circuit 52a, the switches 56a, 56d conduct in response to a clock $\phi_1$ to receive a signal $V_P$ at the capacitor 53 from the column line 19a for sampling. Moreover, the switches 56b, 56c conduct in response to a clock $\phi_2$ to accumulate a sampled signal $V_{SM}$ in the capacitor 55 of the integrator circuit 52b.

With reference to FIG. 8, the reset level of the pixel circuit 32 is integrated in four integration periods $T_{INT1}$, and the signal level of the pixel circuit 32 is integrated in four integration periods $T_{INT2}$. In each of the integration periods $T_{INT1}$, $T_{INT2}$, the column line 19a is connected to the holding capacitor 53 that is larger than the parasitic capacitance of the column line 19a and the input capacitance of the charging circuit 17 in response to the clock $\phi_1$. A charge movement occurs from the parasitic capacitor and input capacitor to the holding capacitor 53, so that the potential of the column line 19b greatly changes temporarily. In the integration periods $T_{INT1}$, $T_{INT2}$, the charging circuit 17 is active in a period $T_{F1}$ shorter than the sampling period where the switches 56a, 56d conduct in response to the clock $\phi_1$. The charging circuit 17 starts a charging operation no earlier than the start point of the sampling period, and stops the charging operation prior to the end point of the sampling period. The charging circuit 17 starts charging according to the potential of the column line 19a in each $T_{F1}$ period as has already been described, and is deactivated by expiration of the period $T_{F1}$. In the period where the switches 56b, 56c conduct in response to a clock $\phi_2$, sampled signals are transferred to the integrator circuit 52b. Using the charging circuit 17 enables high-speed and accurate sampling in the integrator 14b. In a preferred example, it is preferable that, before an integration period of an example, the charging circuit 17 performs sampling of the potential of the column line 19a, and does not sample the potential of the column line 19a in every integration period.

In the image sensor circuit 11c, the output of the integrator 14b serving as a signal processing circuit is connected to the correlated double sampling circuit 15c via the signal line 19b. The operation of the charging circuit 18 in the image sensor circuit 11c will be understood from the description on the sensor circuit 11b. The correlated double sampling circuit 15c can store readout values corresponding to the reset level and signal level received via the signal line 19b from the amplifier 14a.

Next, a modification of the image sensor circuit 11c shown in FIG. 7 will be described. In the image sensor circuit 11c, the integrator 14b reads out a signal from the pixel circuit 32 by using assistance of the charging circuit 17, and the correlated double sampling circuit 15c samples a signal from the integrator 14b by using assistance of the charging circuit 18.

However, in the modification of the image sensor circuit 11c, the charging circuit 18 can be used without using the charging circuit 17 during readout. Alternatively, in the modification of the image sensor circuit 11c, the charging circuit 17 can be used without using the charging circuit 18.

Having illustrated and described the principles of the present invention, it should be apparent to persons skilled in the art that the present invention can be modified in arrangement and detail without departing from such principles. The present invention is not limited to the specific embodiments disclosed herein. We therefore claim all modifications and variations coming within the spirit and scope of the following claims.

INDUSTRIAL APPLICABILITY

According to the present embodiment, provided is a sensor integrated circuit including a sensor circuit, a signal processing circuit, and a readout circuit, which is capable of reducing a signal transmission time from the sensor circuit to the readout circuit, without impairing the accuracy of a final value of a transmitted signal. Moreover, according to the present embodiment, provided is a sensor integrated circuit including a sensor circuit and a signal processing circuit, which is capable of reducing a signal transmission time from the sensor circuit to a readout circuit, without impairing the accuracy of a final value of a transmitted signal.

REFERENCE SIGNS LIST

11 . . . image sensor circuit (sensor integrated circuit), 11b, 11c . . . image sensor circuit, 13 . . . sensor circuit, 14a . . . amplifier, 14b . . . integrator, 15a . . . signal processing circuit, 15b . . . readout circuit, 15c . . . correlated double sampling circuit, 17, 18 . . . charging circuit, 19 . . . signal line, 19a . . . column line, 19b . . . signal line, 21 . . . pixel, 23 . . . input capacitor, 25 . . . drive circuit, 27 . . . output switch, 29 . . . reset switch, Cp . . . parasitic capacitor, $C_{1i}$ . . . input capacitor, $C_{2i}$ . . . input capacitor, Cs . . . capacitor, 31, 31a, 31b, 31c . . . clock generating circuit, 32 . . . pixel circuit, 33 . . . amplifying unit, 35 . . . amplifier circuit, 37 . . . biasing circuit, 39a, 39b . . . first switch, 41a, 41b . . . first capacitor, 43, 45 . . . capacitor, 47 . . . operational amplifier circuit, 49 . . . capacitor, 52a . . . sampling circuit, 52b . . . integrator circuit, 53 . . . holding capacitor, 55 . . . capacitor, 56a to 56d . . . switch, 57 . . . operational amplifier circuit.

The invention claimed is:

1. A sensor integrated circuit comprising:
   a sensor circuit;
   a signal processing circuit; and
   a charging circuit having an input and output connected to a signal line,
   the sensor circuit having a sensor voltage source to which a sensor internal resonance is connected in series,
   the signal processing circuit having a capacitor to which the sensor voltage source is connected via the signal line and a switch,
   the capacitor, at the time of charging of the capacitor, being connected to the sensor voltage source via the switch, at the time of voltage holding of the capacitor, being disconnected from the sensor voltage source by the switch, so that a sensor voltage signal on the capacitor is output from the signal processing circuit,
   the charging circuit including another capacitor connected to the signal line, and a drive circuit at an input side of which the other capacitor is connected and which has a transconductance equivalent to an internal resistance, and the charging circuit including a reset switch which makes an output of the drive circuit and an input of the drive circuit equal in potential, and an output switch which makes the output of the drive circuit and the signal line equal in potential.

2. The sensor integrated circuit according to claim 1, wherein the signal line has a parasitic capacitor Cp (capacitance: Cp), and where the capacitor is provided as $C_{1i}$ (capacitance: Cs), the other capacitor is provided $C_{2i}$ (capacitance: Ca), the sensor internal resistance is provided as Rs, and the internal resistance of the charging circuit is provided as R2, Cp<Ca<Cs, and Ca×R2<Cs×Rs.

3. The sensor integrated circuit according to claim 1, wherein the charging circuit starts a charging operation after a start point of a first driving period for driving of the signal line in response to a potential of the input of the charging circuit, and stops supplying the output of the charging circuit with a charge prior to an end point of the first driving period.

4. The sensor integrated circuit according to claim 1, wherein the signal processing circuit includes an amplifier,
an input of the amplifier receives a signal from the input of the signal processing circuit, and
the amplifier includes third and fourth capacitors that define a gain of the amplifier and an operational amplifier circuit which operates together with the third and fourth capacitors to amplify a signal received at the input of the amplifier.

5. The sensor integrated circuit according to claim 1, wherein the signal processing circuit includes an integrator,
an input of the integrator receives a signal from the input of the signal processing circuit, and
the integrator includes a sampling circuit which samples a signal from the input of the integrator and an integrator circuit which integrates a signal sampled by the sampling circuit.

6. A sensor integrated circuit comprising:
a sensor circuit including a sensor element and an output which outputs a first signal indicating a sense value of the sensor element;
a signal processing circuit including an input which receives the first signal from the sensor circuit in a first receiving period and an output which outputs a second signal generated by processing the first signal;
a readout circuit which receives the second signal in a second receiving period; and
a charging circuit having an input and output connected to a signal line,
the signal processing circuit including either one of an amplifier and an integrator,
either one of the connections between the output of the sensor circuit and the input of the signal processing circuit and between the output of the signal processing circuit and the input of the readout circuit being achieved via the signal line,
either the other of the connections between the output of the sensor circuit and the input of the signal processing circuit and between the output of the signal processing circuit and the input of the readout circuit being achieved via another signal line, and
the charging circuit starting a charging operation after a start point of a first driving period for driving of the signal line in response to a potential of the input of the charging circuit, and stopping supplying the output of the charging circuit with a charge prior to an end point of the first driving period.

7. The sensor integrated circuit according to claim 6, wherein the charging circuit includes an input capacitor having one end connected to the input of the charging circuit, a drive circuit having an input connected to the other end of the input capacitor, and a switch which is connected between an output of the drive circuit and the output of the charging circuit and conducts in a charging period shorter than the first driving period, and
the charging circuit performs sampling of the potential of the signal line for the input capacitor prior to the charging.

8. The sensor integrated circuit according to claim 6, wherein the readout circuit includes a correlated double sampling circuit connected to the output of the signal processing circuit, and
the correlated double sampling circuit includes a first capacitor which stores a first sense signal indicating a sense value in the sensor circuit, a first switch connected between the first capacitor and the input of the readout circuit, a second capacitor which stores a second sense signal indicating a sense value in the sensor circuit, and a second switch connected between the second capacitor and the input of the readout circuit.

9. The sensor integrated circuit according to claim 8, wherein the sensor circuit is a pixel circuit of an image sensor,
the pixel circuit includes a photoelectric conversion element as the sensor element and an amplifier circuit which amplifies a signal from the photoelectric conversion element, and
the first sense signal includes a first pixel signal corresponding to a reset level of the sensor circuit, and the second sense signal includes a second pixel signal including a component of a signal level of the sensor circuit.

10. The sensor integrated circuit according to claim 6, wherein
the signal line achieves a connection between the output of the sensor circuit and the input of the signal processing circuit,
the input of the signal processing circuit has a first input capacitance,
the input of the charging circuit has a second input capacitance,
the second input capacitance is smaller than the first input capacitance,
the output of the sensor circuit has a first output resistance,
the output of the charging circuit has a second output resistance,
the second output resistance is smaller than the first output resistance during charging of the charging circuit,
a change from an initial value to a first driven value and a change from a second driven value to a final value in potential of the signal line are performed by the sensor circuit, and
a change from the first driven value to the second driven value in potential of the signal line is performed by the charging circuit and the sensor circuit.

11. The sensor integrated circuit according to claim 6, wherein
the signal line achieves a connection between the output of the signal processing circuit and the input of the readout circuit,
the input of the readout circuit has a third input capacitance, the input of the charging circuit has a second input capacitance, the output of the signal processing circuit has a third output resistance, the output of the charging circuit has a second output resistance, the second input capacitance is smaller than the third input capacitance, the second output resistance is smaller than the third output resistance during charging of the charging circuit, a change from an initial value to a third driven value and a change from a fourth driven value to a final value in potential of the signal line are performed by the signal processing circuit, and a change from the third driven value to the fourth driven value in potential of the signal line is performed by the charging circuit and the signal processing circuit.

12. The sensor integrated circuit according to claim 6, wherein the signal processing circuit includes the amplifier,
   an input of the amplifier receives a signal from the input of the signal processing circuit, and
   the amplifier includes third and fourth capacitors that define a gain of the amplifier and an operational amplifier circuit which operates together with the third and fourth capacitors to amplify a signal received at the input of the amplifier.

13. The sensor integrated circuit according to claim 6, wherein the signal processing circuit includes the integrator,
   an input of the integrator receives a signal from the input of the signal processing circuit, and
   the integrator includes a sampling circuit which samples a signal from the input of the integrator and an integrator circuit which integrates a signal sampled by the sampling circuit.

* * * * *